(12) United States Patent
Baus

(10) Patent No.: US 8,024,147 B2
(45) Date of Patent: Sep. 20, 2011

(54) OFFSET COMPENSATION CIRCUIT AND YAW RATE SENSOR EQUIPPED THEREWITH

(75) Inventor: Michael Baus, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 12/269,616

(22) Filed: Nov. 12, 2008

(65) Prior Publication Data

US 2009/0121769 A1     May 14, 2009

(30) Foreign Application Priority Data

Nov. 14, 2007    (DE) .......................... 10 2007 054 400
May 27, 2008    (DE) .......................... 10 2008 001 999

(51) Int. Cl.
    *G01C 25/00*     (2006.01)
    *G06F 11/00*     (2006.01)
(52) U.S. Cl. ............................ 702/104; 702/89; 73/1.75
(58) Field of Classification Search .................... 702/33, 702/57, 86–89, 104; 73/1.75, 1.78–1.79, 73/1.88
See application file for complete search history.

(56) References Cited

U.S. PATENT DOCUMENTS

| 5,285,390 | A  | * | 2/1994 | Haseda et al. ................... 701/41 |
| 5,459,679 | A  | * | 10/1995 | Ziperovich ........................ 708/3 |
| 6,253,130 | B1 | * | 6/2001 | Mergenthaler et al. ......... 701/34 |
| 6,314,329 | B1 | * | 11/2001 | Madau et al. ................... 700/89 |
| 6,504,498 | B1 | * | 1/2003 | O'Brien ........................ 341/143 |
| 6,662,097 | B2 | * | 12/2003 | Kin et al. ........................ 701/80 |
| 6,697,728 | B2 | * | 2/2004 | Kin et al. ........................ 701/70 |
| 6,806,756 | B1 | * | 10/2004 | Manlove et al. ............... 327/307 |
| 6,834,543 | B2 | * | 12/2004 | Kin et al. ........................ 73/146 |
| 2009/0037129 | A1 | * | 2/2009 | Kretschmann et al. ......... 702/96 |
| 2009/0228182 | A1 | * | 9/2009 | Waldbauer et al. ............. 701/70 |

\* cited by examiner

*Primary Examiner* — Hal Wachsman
(74) *Attorney, Agent, or Firm* — Kenyon & Kenyon LLP

(57) ABSTRACT

An offset compensation circuit for a yaw rate sensor, having a subtracter, which is provided for subtracting a correction value from an input signal, the correction value being obtainable by dividing each of n measurements of the input signal by the constant n and subsequently integrating a number of n quotients into an integrator. Furthermore, a yaw rate sensor having such an offset compensation circuit.

34 Claims, 2 Drawing Sheets

OFFSET COMPENSATION CIRCUIT AND YAW RATE SENSOR EQUIPPED THEREWITH

RELATED APPLICATION INFORMATION

The present application claims priority to and the benefit of German patent application no. 10 2007 054 400.8, which was filed in Germany on Nov. 14, 2007, and of German patent application no. 10 2008 001 999.2, which was filed in Germany on May 27, 2008, the disclosures of both of which are incorporated herein by reference.

FIELD OF THE INVENTION

The present invention relates to an offset compensation circuit for a sensor, which has a subtracter which is provided for subtracting a correction value from an input signal for obtaining a corrected output value. An offset-afflicted signal is provided here as the input value, for example, a signal of a yaw rate sensor, an acceleration sensor, or a pressure sensor.

BACKGROUND INFORMATION

Subtracting a correction value from an offset-afflicted signal for compensating the offset is known from the related art. The output signal of the offset compensation circuit is reduced by a fixed, predefinable value for obtaining the correction value, or a certain predefinable percentage of the output value is used as the correction value. Due to the negative feedback of the output value of the offset compensation circuit, this is a control loop. However, the disadvantage of this related art is that the offset regulation does not operate very accurately as a function of the noise component of the output signal. Since the correction value is always a fixed proportion of the output value, the correction of a large offset requires a longer time period than the correction of a smaller offset.

SUMMARY OF THE INVENTION

Based on this related art, an object of the present invention is to provide a rapid offset correction which is capable of providing an offset-free output value even shortly after a sensor is put in service. The time needed for the offset correction should be independent of the magnitude of the offset. Furthermore, an object of the present invention is to optimally correct the offset of a sensor signal even in the presence of measurable noise.

The object is achieved according to the present invention by an offset compensation circuit having a subtracter, which is provided for subtracting a correction value from an input signal, the correction value being obtainable by averaging n measurements of the input signal.

An offset is defined here as a permanent deviation from zero, which is superimposed on the measuring signal as a constant. It has been recognized according to the present invention that a rapid and reliable correction of an offset value needs no regulation. According to the present invention, an offset controller is provided which determines a correction quantity uniquely from the input signal of the offset compensation circuit. To ascertain the correction quantity, an average value is determined and subtracted from the input signal of the offset compensation circuit.

The input signal of the offset compensation circuit is obtained from the output signal of the particular sensor. Occasionally, electronic preparation of the raw signal may be provided for this purpose. The electronic data preparation may include an impedance converter, for example. If the sensor is a capacitive sensor, the capacitance constituting the output signal is converted into a voltage. If the offset compensation circuit according to the present invention is designed as a digital circuit, the input signal is supplied to the offset compensation circuit via an analog-digital converter.

The offset controller according to the present invention may be designed as a time-continuous system or as a time-discrete system. In the case of a time-continuous system, the average is formed by integrating the input signal and normalizing to the integration time. For the variation over time of the output value out(t) of the time-continuous circuit according to the present invention, the following is obtained for an input value in(t) and an integration time $\Delta T$:

$$\text{out}(t) = \text{in}(t) - \int_{t_0}^{t_0+\Delta T} \frac{\text{in}(x)}{\Delta T} dx$$

In the case of a time-discrete system, the average is formed by adding up n input signals in n operating cycles and normalizing to the constant n. For the variation over time of the output value out(t) of the circuit according to the present invention, the following is obtained for an input value in(t):

$$\text{out}(t) = \text{in}(t) - \sum_{x=t_0}^{t_0+n\cdot\Delta t} \frac{\text{in}(x)}{n}$$

In a preferred specific embodiment, the average is formed by an adder, which adds up the input values obtained in n measurements together with their particular output value. In the case of a digital design of the circuit, the output value fed back to the adder is additionally provided with a delay element. When delaying by one cycle, in the case of a digital design of the circuit, the output signal is added up synchronously with the particular subsequent input signal. After n cycles, the offset compensation process is stopped. Normalization to the constant n may be performed by dividing each input value by n and then adding them up. Alternatively, the input values may also be added up and then divided by n.

To prevent an offset value saved during the previous run of the offset compensation from being subtracted again from the input signal, thus resulting in an offset having an opposite sign, an additional circuit may be provided to reset the output of the adder to zero prior to the start of the offset compensation. The offset compensation may also be triggered multiple times during operation of the sensor due to the additional circuit for resetting the offset compensation.

If the offset compensation is performed once only after the sensor and the offset compensation circuit have been switched on, this resetting to zero results automatically during the previous operating phase without voltage being supplied or a reset performed. The reset, which results in all registers being erased and the sensor restarted, may be triggered, for example, by an intrinsic event or by an external pin or an SPI instruction. Intrinsic events may be events from the self-diagnosis such as, for example, overvoltage or undervoltage.

In one embodiment of the present invention, the offset compensation circuit, together with the sensor and/or the signal processor of the sensor, may be monolithically integrated on a semiconductor crystal. This makes the construction compact and non-susceptible to errors.

To achieve prompt offset compensation at sufficient accuracy, in one specific embodiment of the present invention constant n is approximately 2 to approximately 2048. Particularly preferably number n is selected in such a way that it corresponds to a power of two. In that case n=$2^x$ where x is selected to be greater than 0 and an integer. If n is a power of two, the implementation of the division via a bit shift is particularly easy. In an optimization step, those skilled in the art will adjust the magnitude of constant n, which also provides the number of compensation steps to be performed, to the particular accuracy requirements and the particular sensor.

The accuracy of the offset controller $c_m$ corresponds to the variance of the average value and is a function of the input noise $C_R$ and the number of the averaging steps n or integration time ΔT. The following relationship applies:

$$c_M = \frac{c_R}{\sqrt{n}}$$

A greater constant n produces a greater accuracy of the offset compensation. On the other hand, a plurality of cycle steps requires a longer execution time than a lower number of cycle steps. The accuracy of the offset compensation should therefore be weighted against its speed. A good compromise results, for example, at 128 or 256 averaging steps. A switchover may optionally be provided to adjust the number of averaging steps to the intended application of the particular sensor. The adjustment may be performed either via a programmable logic, encoding via a saved value n, or digital encoding via a DIP switch. The sensor may be informed, via a programming interface, which of the plurality of saved values is to be used, or the value n is written directly into the sensor via the interface.

To further reduce the noise of the input signal or the output signal of the offset compensation according to the present invention, the input signal and/or the output signal may be filtered with the aid of a low-pass filter. High-frequency noise signals are thus eliminated from the signal. The remaining, low-frequency and therefore relatively low-noise components are then averaged by the offset compensation according to the present invention and subtracted from the input signal.

DETAILED DESCRIPTION

Figure 1:
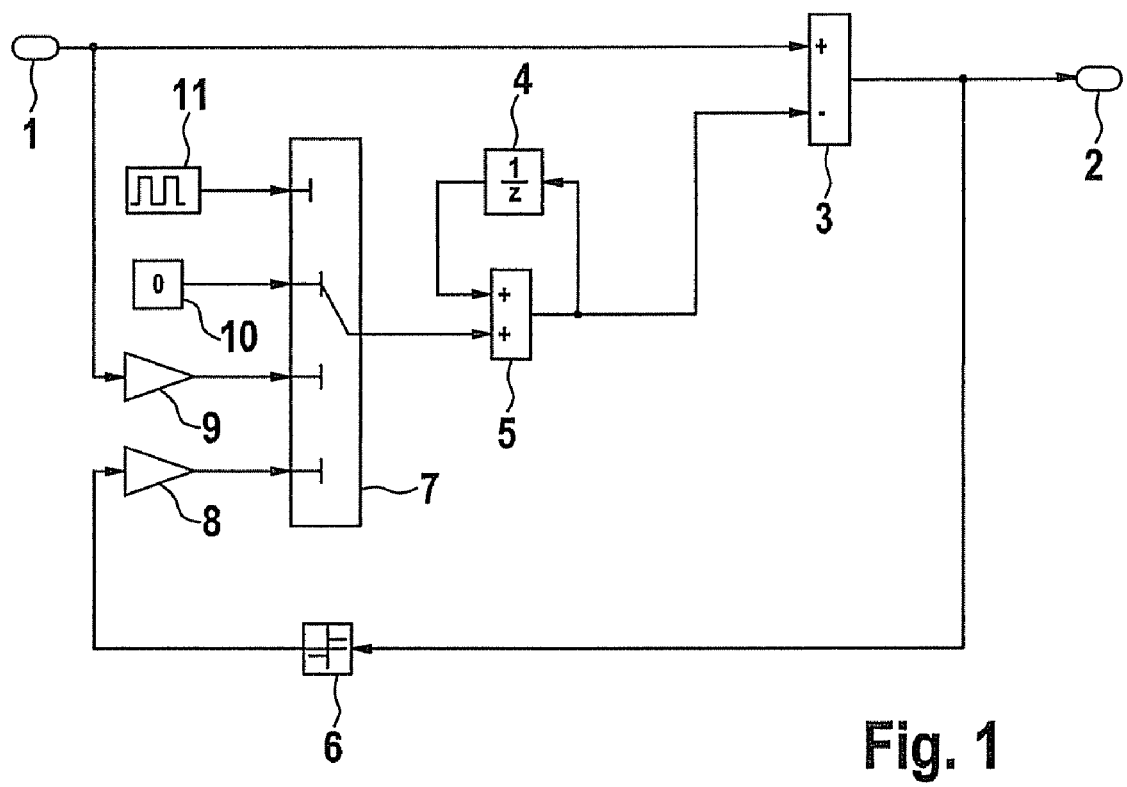
FIG. 1 shows a block diagram of the offset compensation according to the present invention.

FIG. 1 shows a block diagram of the offset compensation according to the present invention in time-discrete, digital circuit technology. An offset-afflicted sensor signal is supplied to the offset compensation circuit according to the present invention via input 1. The offset-afflicted sensor signal was previously converted into the digital format by an analog-digital converter (not depicted). The offset-afflicted input signal from input 1 is supplied to an input of a subtracter 3 after branching. The second branch of the branching is supplied to a divider 9. In each cycle, an input value of offset-afflicted sensor signal 1 is determined and divided by a constant n in divider 9. In the present exemplary embodiment, the constant is selected as n=40.

The digital circuit operates using a predefinable cycle. The cycle may be, for example, 100 Hz up to approximately 100 kHz. In the present exemplary embodiment the clock rate should be 1 kHz. The cycle of the circuit is predefined by a clock generator not depicted in FIG. 1.

The output signal of the divider is supplied to a multiswitch 7, which has at least two inputs and one output. Like all circuit blocks, the multiswitch is also clocked using the cycle of the clock generator (not depicted). The at least two inputs of multiswitch 7 are connected to a zero device 10 and the output of divider 9. In FIG. 1, an optional offset controller is also provided which includes calculator 6 and divider 8. In this case, multiswitch 7 has at least three inputs. Occasionally further compensation circuits may be provided which are each connected to a further input of multiswitch 7. For example, multiple offset compensation circuits according to the present invention may be provided, a plurality of dividers having different constants n being connected to a plurality of inputs of the multiswitch. By selecting the appropriate input, offset controllers of different accuracies and speeds may be selected. Controller 11 is available for selecting an appropriate input and for switching over at predefinable points in time.

FIG. 1 shows the situation in which adder 5 is connected to zero device 10. The adder thus adds the value 0 in each cycle. The result of this summation is also 0. This result is delayed in delay element 4 by one cycle and also supplied to adder 5. The result of the following summation step is again 0. The output signal of adder 5 is thus always 0. This result is subtracted from the input value in subtracter 3. Output value 2 of the offset compensation circuit is thus equal to input value 1. No offset compensation is performed.

When the offset compensation is triggered, multiswitch 7 switches over for n cycles. In the present exemplary embodiment, n is selected to be 40. The output of divider 9 is thus connected to the input of adder 5 for 40 cycles. The adder now adds up 40 measured values, which each represent ¹⁄₄₀ of input value 1. The average value of input signal 1 is available at the output of adder 5 as a result after 40 cycles. Multiswitch 7 then switches back and connects the zero device to the input of adder 5. The output signal of adder 5 no longer changes due to the addition of 0.

Subtracter 3 continuously subtracts the output value of adder 5 from input signal 1, which results in a continuous reduction of the offset. After 40 cycles, the average value of input signal 1 appears at the output of adder 5. As long as the average value is different from the setpoint value 0 at the start of the offset compensation, the exact input value purged of this deviation is available at output 2 of the offset compensation circuit. The average value at output 2 is therefore zero.

The above-described offset compensation is preferably run once when the sensor equipped therewith is put into service and a corrected signal is then made available during the operation of the sensor. Occasionally, however, it may also be provided that the offset compensation is triggered multiple times. This triggering may occur either in an event-controlled manner and, for example, correct a deviation from the setpoint signal, or automatically in settable time intervals or via a user intervention. Prior to rerunning the offset compensation, the output value of both the integrator and adder 5 is set to zero.

If long-term deviations of the output signal from the desired zero value occur during operation, a further compensation circuit may be activated in the depicted example. The latter operates in the depicted example using a controller. For this purpose, output signal 2 is passed through a calculator 6.

In the simplest case, calculator 6 represents a signum function. Calculator 6 thus outputs the value +1 when the deviation of output 2 from the setpoint value is greater than 0. The calculator outputs the value −1 when the deviation of output 2 from the setpoint value is negative. The correction value output by the calculator is divided by a further constant B in a further divider 8. Constant B may be greater or less than, or equal to constant n. The output of divider 8 is connected to the input of adder 5 by an external trigger via multiswitch 7. The correction signal is thus impressed on the input signal by subtracter 3 during time. As a result, a corrected output signal 2 appears. This type of offset correction represents a regulation due to the feedback of output signal 2. The regulation may be switched on and off or run continuously during the operation of the sensor according to the requirements of the application.

Figure 2:
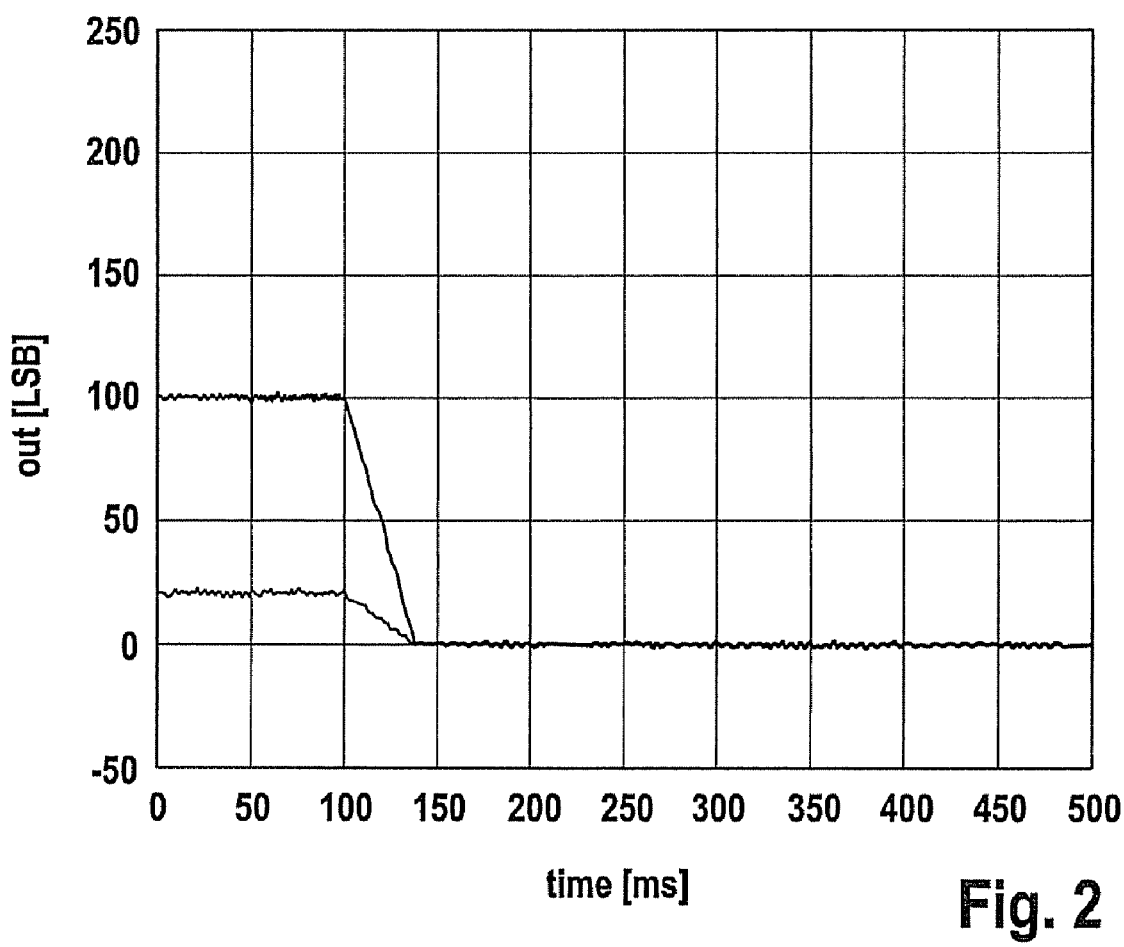
FIG. 2 shows simulated curves of different output offset values when averaged over 40 cycles at a clock rate of one kHz.

FIG. 2 shows simulated typical curves of different output offset values when averaged over n=40 cycles at a clock rate of 1 kHz.

In the diagram of FIG. 2, the time of 0 to 500 ms is plotted on the x axis. The y axis shows output 2 of a sensor.

At point in time t=0, the offset of the sensor is 100 or 20 units. This offset value is superimposed on the actual sensor signal as a constant and remains constant. The sensor signal to be measured is 0 in both examples; for example, a yaw rate sensor is at rest. Furthermore, the sensor signal still has a slight noise signal in the form of the normally distributed deviation of the average value 100 or 20. At point in time t=100 ms, the start of the offset compensation is triggered. Multiswitch 7 connects the output of divider 9 to the input of adder 5 for 40 cycles. The diagram shows that the offset is reduced by a constant value in each cycle. The offset is reduced to zero linearly. The zero value is attained at point in time t=140 ms, which corresponds to 40 cycles at a clock rate of 1 kHz. For a greater offset, the correction per clock cycle is greater than for a smaller offset. Starting at point in time t=140 ms, the average value of the output signal at output 2 is zero. The noise signal, which is superimposed on the zero value, remains unchanged. The zero value remains unchanged until time t=500 ms. In the event of a later deviation from the desired setpoint value 0, either a slower offset regulation may be added via calculator 6 and divider 8, or the above-described offset compensation according to the present invention may also be restarted after resetting adder 5.

What is claimed is:

1. An offset compensation circuit for a yaw rate sensor, comprising:
    a subtracter for subtracting a correction value from an input signal of the yaw rate sensor, the correction value being a function of an average of n consecutive measurements of the input signal, wherein n is a number greater than 2.

2. The offset compensation circuit according to claim 1, further comprising:
    an adder; and
    a delay element, wherein the adder and the delay element are for providing an average by forming a sum of an input signal with an output signal of the adder, delayed by one cycle.

3. The offset compensation circuit according to claim 2, further comprising:
    a device for setting the output signal of the adder to zero before adding a first input value.

4. The offset compensation circuit according to claim 2, further comprising:
    an analog-digital converter for supplying the input signal.

5. The offset compensation circuit according to claim 1, wherein the number n is between 2 and 2048.

6. The offset compensation circuit according to claim 1, wherein the number n is 256.

7. The offset compensation circuit according to claim 1, wherein the number n corresponds to a power of two.

8. The offset compensation circuit according to claim 1, further comprising:
    a low-pass filter for filtering at least one of the input signal and an output signal of the subtracter.

9. The offset compensation circuit according to claim 1, wherein an offset compensation runs once after a power supply is turned on or after a reset.

10. The offset compensation circuit according to claim 1, further comprising:
    a trigger terminal for causing an offset compensation to run.

11. The offset compensation circuit according to claim 1, wherein the n measurements of the input signal are measured at respective n consecutive time cycles from the input signal.

12. The offset compensation circuit according to claim 1, further comprising:
    an adder;
    a delay element, wherein the adder and the delay element are for providing an average by forming a sum of the input signal with an output signal of the adder, delayed by one cycle;
    a device for setting the output signal of the adder to zero before adding a first input value;
    an analog-digital converter for supplying the input signal; and
    a low-pass filter for filtering at least one of the input signal and an output signal of the subtracter;
    wherein the number n is between 2 and 2048.

13. The offset compensation circuit according to claim 12, wherein the number n is 256.

14. The offset compensation circuit according to claim 12, wherein the number n corresponds to a power of two.

15. The offset compensation circuit according to claim 12, wherein an offset compensation runs once after a power supply is turned on or after a reset.

16. The offset compensation circuit according to claim 12, further comprising:
    a trigger terminal for causing an offset compensation to run.

17. The offset compensation circuit according to claim 12, wherein the n measurements of the input signal are measured at respective n consecutive time cycles from the input signal.

18. A yaw rate sensor comprising:
    an offset compensation circuit including a subtracter for subtracting a correction value from an input signal of the yaw rate sensor, the correction value being a function of an average of n consecutive measurements of the input signal, wherein n is a number greater than 2.

19. The yaw rate sensor according to claim 18, further comprising:
    an adder; and
    a delay element, wherein the adder and delay element are for providing an average by forming a sum of the input signal with an output signal of the adder, delayed by one cycle.

20. The yaw rate sensor according to claim 19, further comprising:
    a device for setting the output signal of the adder to zero before adding a first input value.

21. The yaw rate sensor according to claim 19, further comprising:
    an analog-digital converter for supplying the input signal.

22. The yaw rate sensor according to claim 18, wherein the number n is between 2 and 2048.

23. The yaw rate sensor according to claim 18, wherein the number n is 256.

24. The yaw rate sensor according to claim 18, wherein the number n corresponds to a power of two.

25. The yaw rate sensor according to claim 18, further comprising:
 a low-pass filter for filtering at least one of the input signal and an output signal of the subtracter.

26. The yaw rate sensor according to claim 18, wherein an offset compensation runs once after a power supply is turned on or after a reset.

27. The yaw rate sensor according to claim 18, further comprising:
 a trigger terminal for causing an offset compensation to run.

28. The yaw rate sensor according to claim 18, wherein the n measurements of the input signal are measured at respective n consecutive time cycles from the input signal.

29. The yaw rate sensor according to claim 18, further comprising:
 an adder;
 a delay element, wherein the adder and delay element are for providing an average by forming a sum of an input signal with an output signal of the adder, delayed by one cycle;
 a device for setting the output signal of the adder to zero before adding a first input value;
 an analog-digital converter for supplying the input signal;
 a low-pass filter for filtering at least one of the input signal and an output signal of the subtracter;
 wherein the number n is between 2 and 2048, and
 wherein the n measurements of the input signal are measured at respective n consecutive time cycles from the input signal.

30. The yaw rate sensor according to claim 29, wherein the number n is 256.

31. The yaw rate sensor according to claim 29, wherein the number n corresponds to a power of two.

32. The yaw rate sensor according to claim 29, wherein an offset compensation runs once after a power supply is turned on or after a reset.

33. The yaw rate sensor according to claim 29, further comprising:
 a trigger terminal for causing an offset compensation to run.

34. The yaw rate sensor according to claim 29, wherein the n measurements of the input signal are measured at respective n consecutive time cycles from the input signal.

* * * * *